United States Patent

Tateishi et al.

[11] Patent Number: 5,961,681
[45] Date of Patent: *Oct. 5, 1999

[54] METHOD OF DRAWING OPTICAL FIBER PREFORM TO MANUFACTURE OPTICAL FIBER

[75] Inventors: Toshiaki Tateishi, Kameyama; Keigo Maeda; Shigeo Inaba, both of Ichihara, all of Japan

[73] Assignee: The Furukawa Electric Co., Ltd, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/739,180

[22] Filed: Oct. 30, 1996

[30] Foreign Application Priority Data

Nov. 6, 1995 [JP] Japan .................................. 7-286922

[51] Int. Cl.$^6$ .......................... C03B 37/027; C03B 37/07
[52] U.S. Cl. ................................. 65/377; 65/384; 65/381; 65/488
[58] Field of Search .......................... 65/384, 381, 377, 65/486, 488

[56] References Cited

U.S. PATENT DOCUMENTS

| 4,793,840 | 12/1988 | Harding | 65/381 |
| 5,316,562 | 5/1994 | Smithgall | 65/384 |

FOREIGN PATENT DOCUMENTS

| 25736 | 3/1981 | European Pat. Off. | 65/381 |
| 117925 | 5/1988 | Japan | 65/381 |
| 63-265838 | 11/1988 | Japan . | |

*Primary Examiner*—John Hoffmann
*Attorney, Agent, or Firm*—Frishauf, Holtz, Goodman, Langer & Chick, P.C.

[57] ABSTRACT

A method of drawing an optical fiber preform to manufacture an optical fiber, includes the steps of heating an optical fiber preform to temperatures at which the heated preform can be drawn, drawing the heated optical fiber preform by applying tension to the preform, and making the tension substantially constant during the drawing step. The particular method permits manufacturing an optical fiber exhibiting uniform transmitting characteristics, particularly uniform transmission loss, over the entire lengthwise region of the optical fiber, even if the optical fiber is manufactured by drawing an optical fiber preform having a large diameter.

5 Claims, 3 Drawing Sheets

METHOD OF DRAWING OPTICAL FIBER PREFORM TO MANUFACTURE OPTICAL FIBER

BACKGROUND OF THE INVENTION

1. Field of the Invention

The present invention relates to a method of drawing an optical fiber preform under heat to manufacture an optical fiber.

2. Description of the Related Art

In the manufacture of, for example, a quartz series optical fiber, an optical fiber preform having an outer diameter of 40 to 100 mm is inserted from above into a heating furnace. A tip portion of the preform is heated at about 2,000° C. within the furnace so as to be melted and, then, drawn into an optical fiber having a predetermined outer diameter. It is important to control the drawing operation so as to prevent the drawn optical fiber from being changed in properties with progress of the drawing operation. In other words, the drawn optical fiber is required to exhibit uniform properties throughout the entire lengthwise region.

It was customary in the past to set the heating temperature within the furnace to achieve the optimum properties of the optical fiber formed about the start-up time of the drawing operation. Then, the heating temperature within the furnace is set constant during the succeeding drawing operation by monitoring the temperature within the furnace with, for example, a radiation thermometer.

A longer optical cable is required nowadays. Naturally, an optical fiber preform is rendered bulky and larger in outer diameter. If the temperature within the heating furnace is set to achieve the optimum properties of the optical fiber formed about the start-up time of the drawing operation, followed by keeping the furnace temperature constant, as in the conventional method referred to above, a change takes place in the amount of heat actually imparted to the optical fiber preform. Specifically, the heat amount imparted to the optical fiber preform is increased with progress of the drawing operation. In other words, the temperature of the optical fiber preform is gradually elevated with progress of the drawing operation. As a result, the drawing operation is rendered nonuniform so as to bring about nonuniform transmitting characteristics, particularly transmission loss, of the drawn optical fiber throughout the entire lengthwise region of the optical fiber. The change in the heat amount noted above is considered to be derived from a change in the amount of heat radiation from the optical fiber preform itself, said change taking place with progress of the drawing operation applied to the optical fiber preform inserted into the heating furnace.

SUMMARY OF THE INVENTION

An object of the present invention is to provide a method of drawing an optical fiber preform to manufacture an optical fiber exhibiting uniform transmitting characteristics, particularly transmission loss, throughout the entire lengthwise region of the optical fiber. The method of the present invention permits manufacturing a satisfactory optical fiber, even if the optical fiber preform has a large diameter.

According to the present invention, there is provided a method of drawing an optical fiber preform to manufacture an optical fiber, comprising the steps of heating an optical fiber preform to temperatures at which the heated preform can be drawn; drawing the heated optical fiber preform by applying tension to the preform; and making the tension substantially constant during the drawing step.

In the present invention, it is desirable to decrease the heat amount imparted to the optical fiber preform at a predetermined rate in accordance with the remaining length of the optical fiber preform. Specifically, it is desirable to adjust the furnace temperature to meet the equation:

$$T = 0.18 \times 10^{-6} \times (320-L)^3$$

where T is a temperature drop (° C.) within the heating furnace, and L is a remaining length (mm) of an optical fiber preform.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
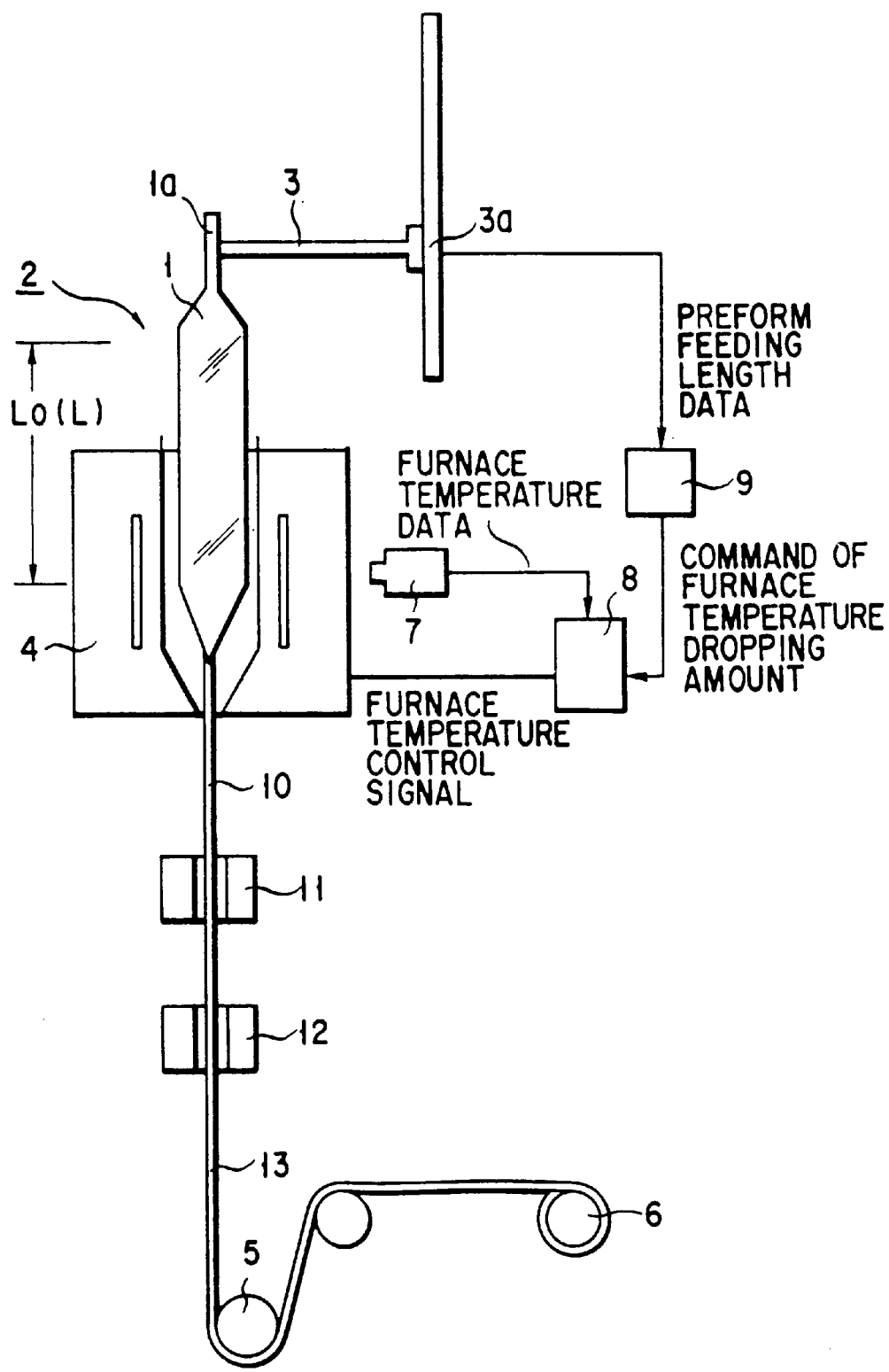
FIG. 1 schematically shows an apparatus for drawing an optical fiber preform by a method according to one embodiment of the present invention.

The molten or softened state of the optical fiber preform within a heating furnace can be detected by measuring the drawing tension applied to the optical fiber during the drawing operation. Where the furnace temperature is set on a constant level, the drawing tension is lowered with progress of the drawing operation applied to the optical fiber preform. In other words, the remaining volume of the preform is decreased and, thus, the heat capacity of the remaining preform is decreased, in accordance with progress of the drawing operation. Also, the amount of heat applied to the optical fiber preform is increased with time. Based on these findings, the present inventors have analyzed the changes in the drawing tension, and found that the drawing tension can be maintained constant by decreasing the amount of heat applied to the optical fiber preform within the heating furnace with progress of the drawing operation, arriving at the present invention.

To be more specific, the drawing method of the present invention comprises the steps of heating an optical fiber preform to melt the tip portion of the preform; drawing under tension the molten optical fiber preform; and making the drawing tension substantially constant throughout the drawing operation.

In the heating step of the optical fiber preform, the preform is heated so as to be melted and drawn. The heating temperature depends on the material of the optical fiber preform. Where the optical fiber preform is made of a quartz-based material, the preform is heated to about 2,000° C.

In the subsequent step of drawing the molten preform, the drawing tension applied to the preform, which is determined in view of the desired fiber characteristics, should fall within a range of between 20 g and 60 g in order to suppress the transmission loss as much as possible.

It is important in the present invention that the drawing tension applied to the molten preform be maintained substantially constant throughout the drawing operation. The drawing tension can be maintained constant by several methods. For example, the drawing tension can be maintained constant by adjusting the temperature within the heating furnace, by dropping the temperature within the furnace in accordance with the remaining length (or volume) of the preform, and by changing the flow rate of the gas supplied to the furnace. By taking any of these measures, the amount of heat (or temperature) applied to the optical fiber preform can be maintained constant during the drawing operation.

If the amount of heat applied to the optical fiber preform is decreased in accordance with the remaining length of the optical fiber preform, the drawing tension can be maintained constant during the drawing operation. As a result, the drawn optical fiber is enabled to exhibit uniform transmitting characteristics over the entire length thereof. Particularly, the drawn optical fiber is prevented from bearing an increased transmission loss in accordance with the remaining length of the preform.

Where the temperature within the heating furnace is dropped in accordance with the remaining length (or volume) of the preform, it is desirable, in view of the controllability which depends on the facilities, to drop the temperature at a predetermined rate. Although the degree of temperature drop depends on the temperature distribution within the heating furnace, it is desirable to drop the temperature within the heating furnace to meet, for example, the equation:

$$T = 0.18 \times 10^{-6} \times (320-L)^3$$

where T is a temperature drop (° C.) within the heating furnace, and L is the remaining length (mm) of the preform.

Figure 5:
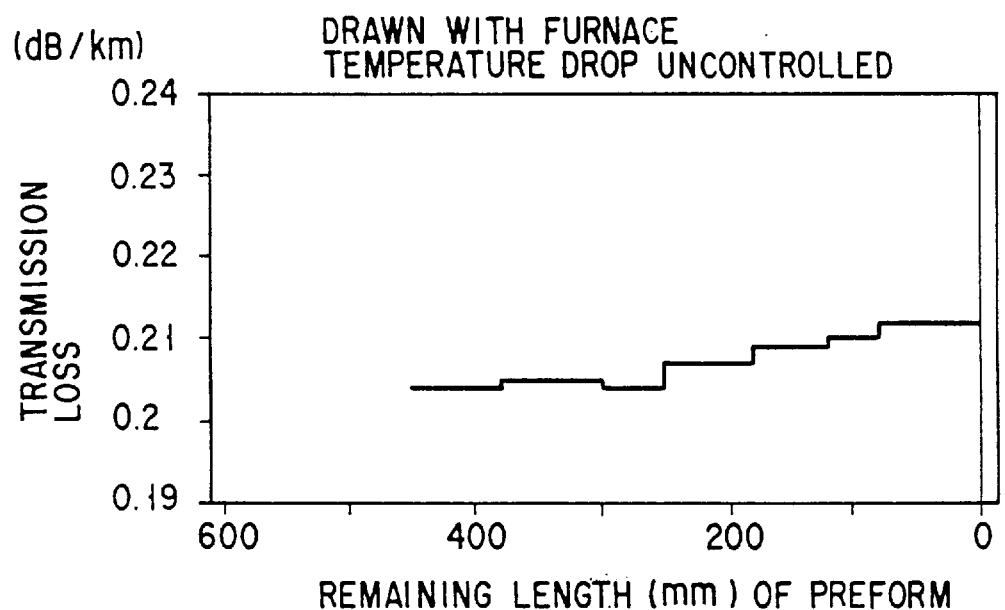
FIG. 5 is a graph showing changes in the transmission loss in the longitudinal direction of the optical fiber prepared by a conventional drawing method.

The temperature drop T (° C.) given above is closely related to the remaining length L (mm) given above. To be more specific, FIG. 5 shows the relationship between the drawing tension and the remaining length of the preform. In order to control the furnace temperature to diminish the change in the drawing tension as shown in FIG. 5, the cubic formula given above can be obtained by making approximation using a suitable function. Therefore, it has been found that the equation given above, which involves the remaining length L as a variable, represents the optimum approximate relationship with the temperature drop T. The drawn optical fiber is rendered uniform in its transmitting characteristics over the entire length by dropping the furnace temperature to meet the equation given above.

Let us describe more in detail the method of the present invention with reference to the accompanying drawings.

Specifically, FIG. 1 schematically shows an apparatus used for drawing an optical fiber preform by a method according to one embodiment of the present invention. Reference numeral 1 in the drawing denotes an optical fiber preform, with numeral 2 representing an apparatus for drawing the preform 1 to manufacture an optical fiber. The drawing apparatus 2 comprises a holding member 3 movable in a vertical direction and serving to hold an upper end of the optical fiber preform 1. The holding member 3 is moved up and down by a lift means 3a. Further, a heating furnace 4 having a passageway through which the optical fiber preform 1 can be inserted into an inner region of the furnace 4 is arranged below the holding member 3.

A furnace temperature measuring apparatus 7, which is electrically connected to a furnace temperature control unit 8, is arranged sideward of the heating furnace 4. The furnace temperature control unit 8 is electrically connected to a calculating unit 9 for calculating the furnace temperature dropping amount. Further, the calculating unit 9 is electrically connected to a driving means 3a. As apparent from the construction described above, information on a feed length of the optical fiber preform is forwarded from the lift means 3a to the calculating unit 9 for calculating the furnace temperature dropping amount. The furnace temperature dropping amount calculated in the calculating unit 9 is forwarded to the furnace temperature control apparatus 8. Information on the furnace temperature measured by the furnace temperature measuring apparatus 7 is also forwarded to the furnace temperature control apparatus 8. Further, a furnace temperature control signal generated from the furnace temperature control apparatus 8 based on the furnace temperature and furnace temperature dropping amount is forwarded to the heating furnace 4 so as to control the temperature of the heating furnace.

A pulling capstan 5 and a wind-up bobbin 6 are arranged below the heating furnace 4. As apparent from the drawing, the drawn optical fiber 13 is wound up about the bobbin 6. Further, a coating apparatus 11 for coating the drawn optical fiber with resin is arranged below the heating furnace 4, and a curing furnace 12 for curing the resin coating of the drawn optical fiber is arranged below the coating apparatus 11.

Suppose the drawing apparatus 2 of the construction described above is used for drawing the optical fiber preform 1 so as to prepare the optical fiber 13. Before start-up of the operation, a remaining length $L_0$ (mm) of the optical fiber preform 1 is measured, and the measured value is supplied to the calculating unit 9 for calculating the furnace temperature dropping amount.

In the next step, the lower end portion of the optical fiber preform 1 is forwarded into the heating furnace 4 heated to about 2,000° C., with an upper supporting part 1a of the preform 1 held by the holding member 3. As a result, the lower end portion of the preform 1 is melted by heat within the furnace 4 and drawn to prepare a bare optical fiber 10 having a diameter of 125 $\mu$m. The bare optical fiber 10 is coated with, for example, an ultraviolet-curing resin in the coating apparatus 10. Further, the coated optical fiber is passed through the curing furnace 12 so as to cure the resin coating and, thus, to manufacture the resin-coated optical fiber 13. The resin-coated optical fiber 13 is pulled by the pulling capstan 5 and, then, wound about the bobbin 6.

In preparing the bare optical fiber 10 by drawing the preform 1, the temperature within the heating furnace 4 is gradually dropped in accordance with a decrease in the remaining length L (mm) of the optical fiber preform 1. As a result, the amount of heat applied to the optical fiber preform is decreased with a decrease in the amount of heat radiated from the preform. It follows that an excess amount of heat is not applied to the optical fiber preform 1 even if the remaining length of the preform 1 is decreased, making it possible to carry out the drawing operation with a predetermined tension.

The temperature drop within the heating furnace should be carried out to meet the equation "$T=1.08\times10^{-6}\times(320-L)^3$", where T is the temperature drop (° C.) within the heating furnace 4, and L is the remaining length (mm) of the optical fiber preform 1. The value "$1.08\times10^{-6}$" in this equation represents a coefficient of a cubic functional approximate formula, and the value "320" denotes the initial length of the optical fiber preform at the time when the temperature drop within the heating furnace begins to be controlled. In other words, the temperature drop within the heating furnace begins to be controlled when the remaining length L is decreased to 320 mm.

It should be noted that the remaining length L of the optical fiber preform 1 is calculated by supplying a signal denoting the feeding amount (dropping amount) of the holding member 3 to the calculating unit 9 for calculating the furnace temperature dropping amount. A signal denoting the remaining length L (mm) thus calculated is supplied to the furnace temperature control unit 8 together with a signal generated from the furnace temperature measuring apparatus 7. Based on these signals, controlling of the furnace temperature dropping is performed within the unit 8 in accordance with the equation given above.

Figure 2:
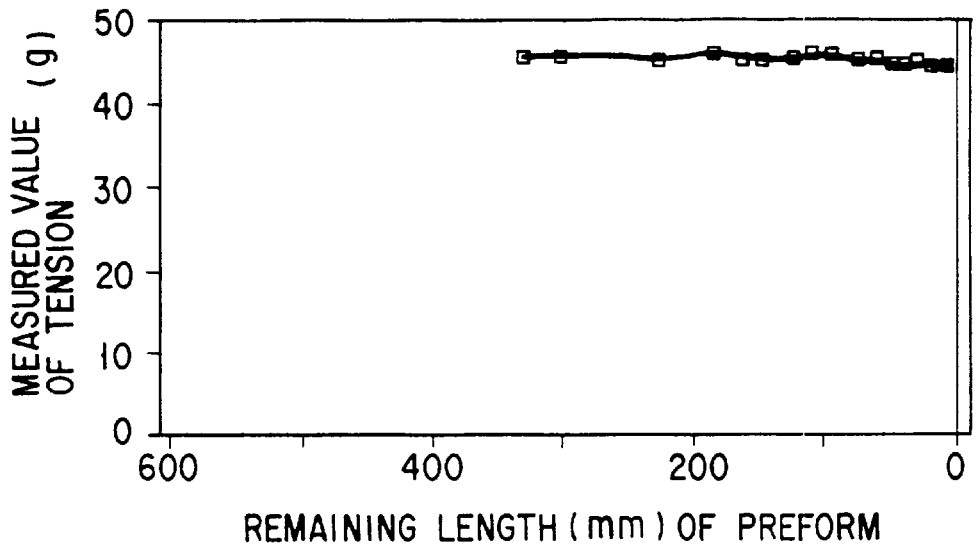
FIG. 2 is a graph showing the relationship between the drawing tension applied to the optical fiber preform and the remaining length (or volume) of the optical fiber preform, covering the case where an optical fiber preform is drawn by the apparatus shown in FIG. 1.

FIG. 2 shows experimental data relating to changes in tension, covering the case where the preform 1 was drawn while controlling the furnace temperature in accordance with the equation defined in the present invention. For comparison, FIG. 3 also shows similar experimental data, covering the case where the furnace temperature was set constant during the drawing operation as in the prior art. The tension was obtained by a on-line system based on a known method, e.g., by measuring the vibration of the optical fiber immediately after the drawing operation.

Figure 3:
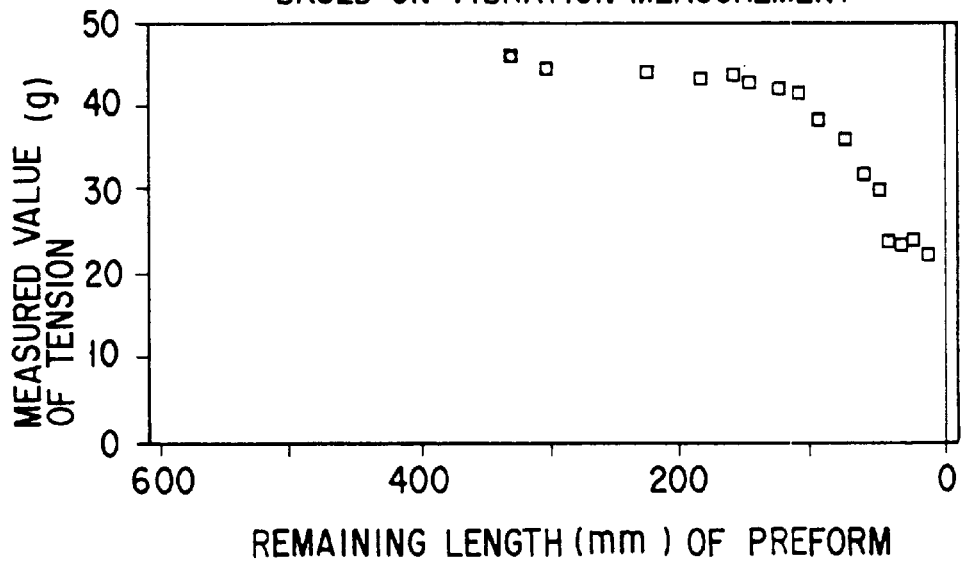
FIG. 3 is a graph showing the relationship between the drawing tension applied to the optical fiber preform and the remaining length of the optical fiber preform, covering a conventional method in which the temperature within the heating furnace is not dropped during the drawing operation.

As apparent from FIG. 2, the drawing tension is maintained constant in the method of the present invention. To reiterate, the furnace temperature is dropped in accordance with the remaining length of the optical fiber preform in the method of the present invention. As a result, an excess heat is not imparted to the optical fiber preform during the drawing operation. In other words, it is possible to suppress the change in the heat amount imparted to the preform during the drawing operation, leading to the constant drawing tension noted above. On the other hand, FIG. 3 shows that the drawing tension is lowered in accordance with a decrease of the remaining length of the preform, when it comes to the conventional method in which the furnace temperature is set constant during the drawing operation. In other words, the drawing tension is greatly changed in the conventional method.

Figure 4:
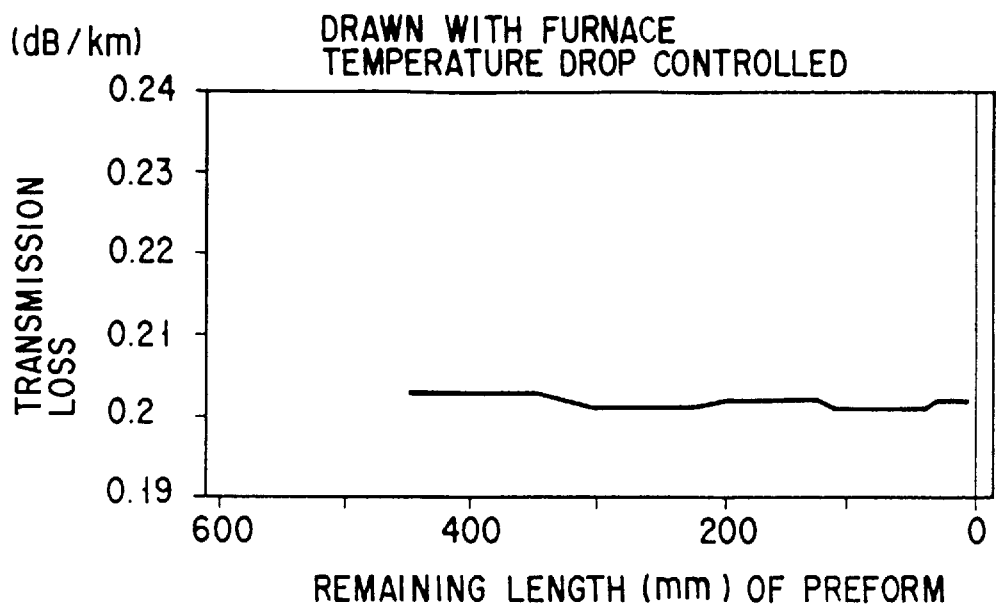
FIG. 4 is a graph showing changes in the transmission loss in the longitudinal direction of the optical fiber prepared by the drawing method of the present invention.

FIG. 4 shows changes in the transmission loss in the longitudinal direction of the optical fiber, covering the case where the optical fiber preform was drawn while controlling the furnace temperature, as in the present invention. The transmission loss was measured by a monochromatic measuring machine. As apparent from FIG. 4, the method of the present invention makes it possible to suppress substantially completely the change in the transmission loss in the longitudinal direction of the drawn optical fiber. On the other hand, FIG. 5 shows changes in the transmission loss in the longitudinal direction of the optical fiber, covering the case where the optical fiber preform was drawn while controlling the furnace temperature by the conventional method. It is clearly seen from FIG. 5 that the transmission loss is greatly changed in the longitudinal direction of the drawn optical fiber.

In the embodiment described above, the temperature drop T (° C.) within the heating furnace is determined by an approximate formula of a cubic function. In addition, the temperature drop T (° C.) can be determined by another approximate formula of a linear function, quadratic function, or exponential function. In practice, the temperature drop T (° C.) can be determined by using a suitable approximate formula selected from among those exemplified above.

As described above, the present invention provides a method of drawing an optical fiber preform to manufacture an optical fiber. In the present invention, the heat amount imparted to the optical fiber preform is decreased with progress of the drawing operation so as to maintain the drawing tension substantially constant during the drawing operation. As a result, the drawn optical fiber is allowed to exhibit uniform transmitting characteristics in the longitudinal direction. It should be noted in particular that the temperature within the heating furnace is dropped at a predetermined rate in accordance with the remaining length of the optical fiber preform. For example, the temperature drop T (° C.) within the heating furnace is determined to meet the equation "$T=1.08\times10^{-6}\times(320-L)^3$", where T is the temperature drop (° C.) within the heating furnace, and L is the remaining length of the optical fiber preform 1, making it possible to prevent the transmission loss from being increased with progress of the drawing operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of drawing an optical fiber preform to manufacture an optical fiber, comprising the steps of:
    inserting an optical fiber preform into a heating furnace and heating the optical fiber preform to temperatures at which the preform which is heated can be drawn;
    drawing the optical fiber preform which is heated by applying tension to the preform; and
    making the tension substantially constant during the drawing step by decreasing a temperature within the heating furnace over time, during the drawing step, as a function of a remaining length of the optical fiber preform, to thereby decrease a heat amount to be applied to the preform over time during the drawing step, said temperature within the heating furnace being decreased in said temperature decreasing step, to meet an equation $T=1.08\times10^{-6}\times(320-L)^3$, where T is a temperature drop (° C.) with time within the heating furnace, and L is the remaining length (mm) of the optical fiber preform.

2. A method of drawing an optical fiber preform to manufacture an optical fiber, comprising the steps of:
    inserting an optical fiber preform into a heating furnace by using a lift;
    measuring a temperature within the heating furnace;
    heating the optical fiber preform within the heating furnace to temperatures at which the heated preform can be drawn;
    drawing the heated optical fiber preform by applying tension to the heated preform;

calculating, at a plurality of times, a temperature drop at a point within the heating furnace based on an amount of a downward movement of the lift; and controlling a temperature within the heating furnace, and throughout the drawing process, based on the calculated temperature drops, the measured temperature within the heating furnace and a remaining length of the optical fiber preform to be drawn.

3. The method according to claim 2, wherein the temperature is calculated to meet an equation $T=1.08\times10^{-6}\times(320-L)^3$, where T is a temperature drop (° C.) within the heating furnace, and L is a remaining length (mm) of the optical fiber preform.

4. The method according to claim 3, wherein said step of controlling the temperature comprises decreasing the temperature over time within the heating furnace.

5. The method according to claim 2, wherein said step of controlling the temperature comprises decreasing the temperature over time within the heating furnace.

* * * * *